US012142410B2

(12) United States Patent
Masuda et al.

(10) Patent No.: US 12,142,410 B2
(45) Date of Patent: Nov. 12, 2024

(54) IRON CORE FOR STATIONARY INDUCTION APPARATUS AND STATIONARY INDUCTION APPARATUS

(71) Applicants: TOSHIBA INDUSTRIAL PRODUCTS AND SYSTEMS CORP., Mie (JP); Masato Enokizono, Oita (JP)

(72) Inventors: Tsuyoshi Masuda, Mie (JP); Eiji Shimomura, Mie (JP); Masato Enokizono, Mie (JP)

(73) Assignees: Toshiba Industrial Products and Systems Corp., Kanagawa (JP); Masato Enokizono, Oita (JP)

( * ) Notice: Subject to any disclaimer, the term of this patent is extended or adjusted under 35 U.S.C. 154(b) by 687 days.

(21) Appl. No.: 17/413,508

(22) PCT Filed: Nov. 6, 2019

(86) PCT No.: PCT/JP2019/043459
§ 371 (c)(1),
(2) Date: Jun. 11, 2021

(87) PCT Pub. No.: WO2020/121691
PCT Pub. Date: Jun. 18, 2020

(65) Prior Publication Data

US 2022/0051840 A1 Feb. 17, 2022

(30) Foreign Application Priority Data

Dec. 13, 2018 (JP) ................................ 2018-233410

(51) Int. Cl.
*H01F 27/24* (2006.01)
*H01F 27/245* (2006.01)
(Continued)

(52) U.S. Cl.
CPC ....... *H01F 27/245* (2013.01); *H01F 41/0233* (2013.01); *H01F 1/16* (2013.01)

(58) Field of Classification Search
CPC ...... H01F 27/245; H01F 41/0233; H01F 1/16; H01F 41/024; H01F 27/2455
(Continued)

(56) References Cited

U.S. PATENT DOCUMENTS 4,140,987 A * 2/1979 Maezima .............. H01F 27/245 336/60
4,283,842 A * 8/1981 DeLaurentis ......... H01F 27/245 29/609
(Continued)

FOREIGN PATENT DOCUMENTS

EP 3 196 319 7/2017
JP S59 172220 9/1984
(Continued)

OTHER PUBLICATIONS

Extended European Search Report in Application 19895918.1, dated Aug. 12, 2022.
(Continued)

*Primary Examiner* — Tszfung J Chan
*Assistant Examiner* — Kazi S Hossain
(74) *Attorney, Agent, or Firm* — DLA Piper LLP US

(57) ABSTRACT

An iron core (1, 11, 31) for a stationary induction apparatus according to one embodiment is configured by laminating a plurality of electromagnetic steel plates (5, 16, 33). The electromagnetic steel plates are laminated so that joint parts (6, 17, 18, 32), at which the end portions of the electromagnetic steel plates abut one another, are disposed in a staggered manner; and the electromagnetic steel plates are provided with a magnetic domain fine differentiation processed part (7, 19, 34), which is located on the portion, of a
(Continued)

surface of the end portion of each of the electromagnetic steel plates, lapped with the joint part of another electromagnetic steel plate, and which has been subjected to warping-derived magnetic domain fine differentiation.

6 Claims, 8 Drawing Sheets

(51) Int. Cl.
*H01F 41/02* (2006.01)
*H01F 1/16* (2006.01)

(58) Field of Classification Search
USPC .................................... 336/234, 221, 55–61
See application file for complete search history.

(56) References Cited

U.S. PATENT DOCUMENTS

| | | | | |
|---|---|---|---|---|
| 4,520,556 A * | 6/1985 | Pasko, Jr. | H01F 27/245 | 336/212 |
| 4,521,957 A * | 6/1985 | McLeod | H01F 27/245 | 336/212 |
| 5,959,523 A * | 9/1999 | Westberg | H01F 27/245 | 336/216 |
| 2002/0067239 A1* | 6/2002 | Nathasingh | H01F 27/25 | 336/212 |
| 2006/0226946 A1* | 10/2006 | Pauley | H01F 41/0233 | 336/234 |
| 2006/0226947 A1* | 10/2006 | Pauley | H01F 27/245 | 336/234 |
| 2013/0147588 A1* | 6/2013 | Sarver | H01F 27/245 | 29/606 |
| 2017/0253942 A1* | 9/2017 | Shim | C21D 6/008 | |
| 2017/0278617 A1 | 9/2017 | Masato et al. | | |
| 2020/0126709 A1* | 4/2020 | Mizumura | H01F 27/2455 | |

FOREIGN PATENT DOCUMENTS

| | | | |
|---|---|---|---|
| JP | S61 12008 | 1/1986 | |
| JP | S6112008 A * | 1/1986 | H01F 27/24 |
| JP | H01-38898 Y2 | 11/1989 | |
| JP | H07 283036 | 10/1995 | |
| WO | WO 2018/131613 | 7/2018 | |

OTHER PUBLICATIONS

Japanese Office Action in Application No. 2018-233410, dated Jun. 2, 2020.
Japanese Office Action in Application No. 2018-233410, dated Oct. 13, 2020.

* cited by examiner

IRON CORE FOR STATIONARY INDUCTION APPARATUS AND STATIONARY INDUCTION APPARATUS

CROSS REFERENCE TO RELATED APPLICATIONS

This application is a U.S. National Stage Application of International Application No. PCT/JP2019/043459 filed Nov. 11, 2019, which claims priority from Japanese Patent Application No. 2018-233410 filed Dec. 13, 2018. The entirety of all the above-listed applications are incorporated herein by reference.

TECHNICAL FIELD

Embodiments of the present invention relate to an iron core for a stationary induction apparatus and a stationary induction apparatus.

BACKGROUND ART

As the iron cores of stationary induction apparatuses, for example, transformers, so-called laminated iron cores configured by laminating a plurality of electromagnetic steel plates such as silicon steel plates are known. For example, in a laminated iron core for a three-phase transformer, three leg parts and upper and lower yoke parts are joined. It has been pointed out that, at this time, particularly at the joint part between the central leg part and the yoke part, a rotational magnetic flux in a direction different from the rolling direction of the electromagnetic steel plate occurs, which increases the loss, that is, iron loss. Patent Literature 1 therefore makes a proposition to perform magnetic domain fine differentiation control by subjecting the surface of the electromagnetic steel plate constituting the laminated iron core to magnetic domain fine differentiation which involves laser irradiation in a grid pattern of the vertical and horizontal directions with respect to the rolling direction in order to reduce the loss.

CITATION LIST

Patent Literature

Patent Literature 1: Japanese Patent Laid-Open No. 2015-106631

SUMMARY OF INVENTION

By the way, one type of the iron cores for transformers is so-called one-turn cut type wound iron cores which are formed by winding a plurality of strip-like electromagnetic steel plates while providing at least one butt joint part for each winding. For wound iron cores, for example, butt joint parts are provided in a lower yoke part, and at the joint parts, electromagnetic steel plates are wound in a stepwise staggered manner. At this time, for example, a nonmagnetic sheet member is located at the joint part to provide an air gap of a fixed width.

However, in an iron core having such joint parts disposed in a stepwise staggered manner and eventually an air gap, the magnetic flux flowing through the iron core flows, passing over the electromagnetic steel plates abutting in the stacking direction in the air gap portion. This causes the problem that the magnetic resistance at the joint part increases and a loss occurs. In this case, the iron core can be not only the aforementioned wound iron core but also a laminated iron core configured by laminating a plurality of electromagnetic steel plates, forming yoke parts and leg parts and making them abut one another into a frame shape at the joint parts. This laminated iron core also has step-lap joint parts at which the butt joint parts between the yoke part and the leg part are disposed in a stepwise staggered manner in the stacking direction, which causes the problem that a loss occurs at the joint parts.

From this point of view, provided are an iron core for stationary induction apparatus and a stationary induction apparatus. The iron core is configured by laminating a plurality of electromagnetic steel plates that are laminated so that the joint parts at which the end portions of the electromagnetic steel plates abut one another are disposed in a staggered manner, whereby the loss due to magnetic resistance at the joint parts can be kept low.

An iron core for a stationary induction apparatus according to one embodiment is configured by laminating a plurality of electromagnetic steel plates. The electromagnetic steel plates are laminated so that joint parts, at which the end portions of the electromagnetic steel plates abut one another, are disposed in a staggered manner; and the electromagnetic steel plates are provided with a magnetic domain fine differentiation processed part, which is located on the portion, of a surface of the end portion of each of the electromagnetic steel plates, lapped with the joint part of another electromagnetic steel plate, and which has been subjected to warping-derived magnetic domain fine differentiation.

DESCRIPTION OF EMBODIMENTS (1) First Embodiment

Figure 1:
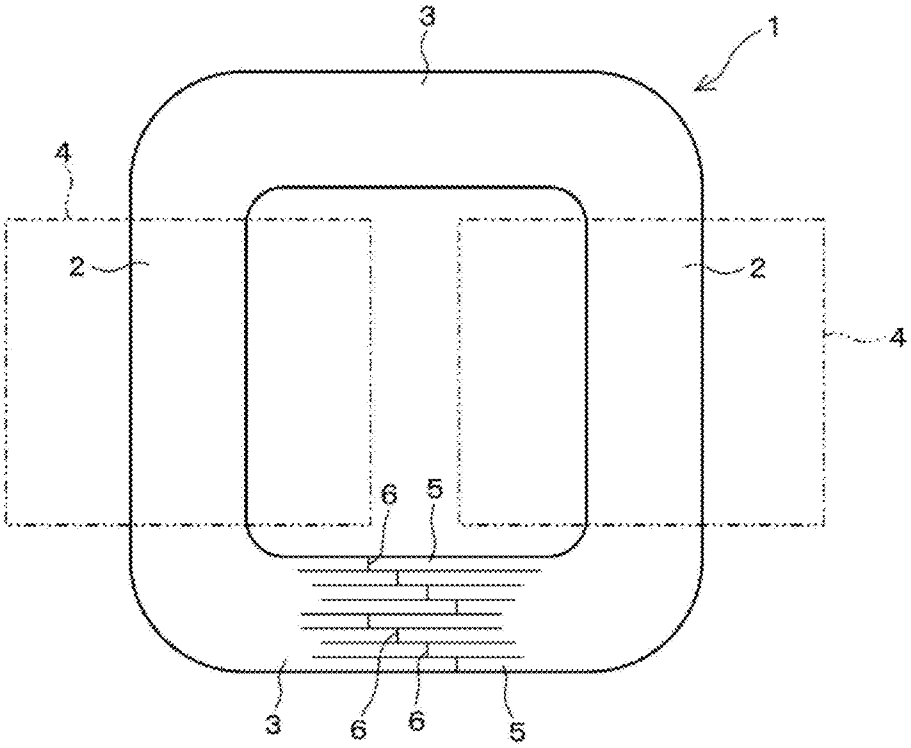
FIG. 1 is a front view schematically showing an overall configuration of a wound iron core according to a first embodiment.

The first embodiment applied to a wound iron core constituting a single-phase transformer as a stationary induction apparatus will now be described with reference to FIGS. 1 to 4. FIG. 1 shows the overall configuration of a wound iron core 1 for a transformer as an iron core for a stationary induction apparatus according to this embodiment. This wound iron core 1 in a rectangular annular shape with rounded corners has two leg parts 2 and 2 extending in the up-and-down direction in the drawing, and yoke parts 3 and 3 connecting the upper end portions and the lower end portions of the leg parts 2 and 2 in the left-and-right direction. A winding 4 (represented by an imaginary line) is mounted to each of the leg parts 2 and 2. When directions are mentioned in the following description, the description will be made taking the state shown in FIG. 1 as the front view.

Figure 2:
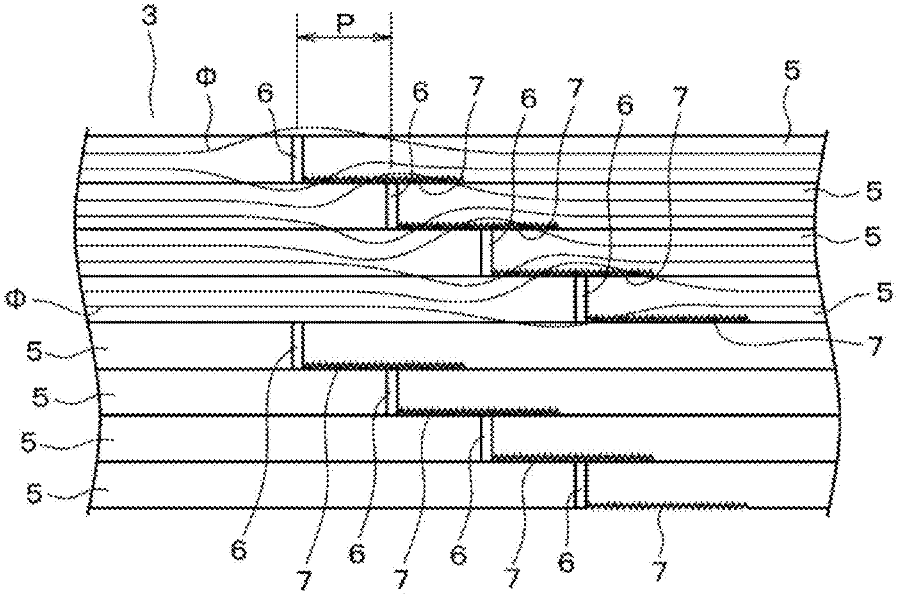
FIG. 2 is an enlarged front view of a joint part portion according to the first embodiment.

As shown in FIG. 2, this wound iron core 1 is of a so-called one-turn cut type. In other words, the wound iron core 1 is formed by cutting a strip member 5 that is a strip-like electromagnetic steel plate, for example, a silicon steel plate, into a required size for each roll, and winding and laminating each sheet of strip member 5 in the inner and outer peripheral direction while providing a joint part 6 where their end portions abut one another. An oriented electromagnetic steel plate is used for each strip member 5, and the longitudinal direction, that is, the winding direction coincides with the rolling direction.

In this embodiment, the joint parts 6 are configured to come to the central portion of the lower yoke part 3, and as shown in FIG. 2, the joint parts 6 are laminated so that they are lapped with each other stepwise and displaced by a fixed pitch p in the winding direction, that is, the radial direction of the strip members 5. In this case, in the yoke part 3 at the lower part of the wound iron core 1, the joint parts 6 are sequentially displaced to the right in the drawing from the inner peripheral side to the outer peripheral side. Further, the yoke part 3 is divided into a plurality of blocks in the winding direction, or two blocks in the drawing, and the joint parts 6 are repeatedly disposed stepwise. Although not shown in the drawing, a sheet-like magnetic insulator is disposed at each joint part 6 to provide an air gap of a predetermined size.

Figure 3:
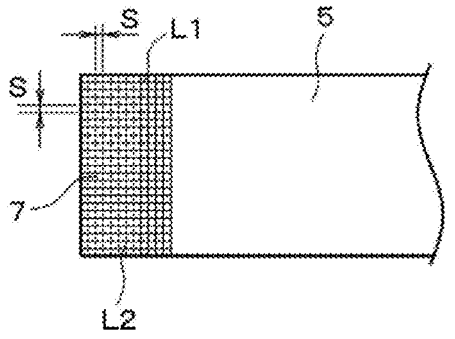
FIG. 3 is an enlarged bottom view of an end portion of the electromagnetic steel plate according to the first embodiment.

By the way, in this embodiment, as shown in FIGS. 2 and 3, magnetic domain fine differentiation processed parts 7 that have been subjected to warping-derived magnetic domain fine differentiation are provided in positions lapped with the joint parts 6 of the other strip members 5 on the surfaces of the end portions of the strip members 5. The magnetic domain fine differentiation processed parts 7 are represented by the fine jagged lines for convenience in FIG. 2. Each magnetic domain fine differentiation processed part 7 is provided on one side, in this case, the right side of the corresponding joint part 6 and on one surface, in the drawing, the lower surface side of the end portion of the strip member 5. Further, the magnetic domain fine differentiation processed part 7 is provided within a certain range, for example, in a range of a length of about twice the pitch p of the displacement of the joint part 6 all over in the width direction of the strip member 5. This range is defined as a range in which each magnetic flux ϕ lies over another overlapping strip member 5 on the surface of the end portion of the strip member 5. In FIG. 2, magnetic fluxes ϕ are represented by thin lines only in the upper four strip members 5.

More specifically, as shown in FIG. 3, the magnetic domain fine differentiation processed parts 7 are formed by subjecting the lower surface of the end portion of each strip member 5 to continuous linear laser irradiation in a grid pattern in two directions orthogonal to each other. Consequently, linear marks L1 and L2 due to laser irradiation are formed on the lower surface of the end portion of the strip member 5. Among them, many linear marks L1 extend in the rolling direction of the strip member 5 in parallel at a predetermined interval s. Meanwhile, many linear marks L2 also extend in the direction orthogonal to the linear marks L1, in this case, in the direction orthogonal to the rolling direction of the strip members 5 in parallel at a predetermined interval s.

In this case, the interval s at which the linear marks L1 and L2 are formed is, for example, 2.0 mm or less. Note that the laser irradiation on the electromagnetic steel plate, that is, the strip members 5, can be performed using a well-known general-purpose laser irradiation device. The conditions of the laser irradiation at this time are disclosed, for example, in Japanese Patent Application Publication No. 2015-106631 (paragraph [0023], FIG. 8), and the description thereof is therefore omitted here.

The acts and effects and advantages of the wound iron core 1 with the aforementioned configuration will now be explained with reference to FIG. 4. First, the procedure for assembling the wound iron core 1 will be briefly explained. In particular, assembling of the wound iron core 1 includes cutting the strip members 5 of a predetermined width into a required length, and subjecting the surfaces of the end portion of the strip members 5, that is, the lower surface sides to laser irradiation to form the magnetic domain fine differentiation processed parts 7. Subsequently, the strip members 5 provided with the magnetic domain fine differentiation processed parts 7 are wound into a quadrangular annular shape, for example, in order, peripherally innermost first so that the end portion is located at the lower yoke part 3. In this case, the strip members 5 are wound and closely laminated one by one, from the peripherally innermost toward the outermost.

At the time of this winding, the joint parts 6 are formed so that both end portions of each strip member 5 are close to each other. At this time, as described above, the strip members 5 are wound while the joint parts 6 are positioned so that they are located stepwise. As a result, the wound iron core 1 with the joint parts 6 disposed in a stepwise staggered manner in the winding direction of the strip members 5. At this time, as shown in FIG. 2, the magnetic domain fine differentiation processed parts 7 on the lower surfaces of the strip members 5 located on the upper surfaces of the joint parts 6 are positioned so as to be lapped with the joint parts 6.

Since, as shown in FIG. 2, the wound iron core 1 with the aforementioned configuration has joint parts 6 where the end portions of the strip members 5 abut one another in the lower yoke part 3, as only the upper half shows, each magnetic flux ϕ at the joint part 6 flows across the strip members 5 abutting in the stacking direction. There is therefore the risk that the magnetic resistance increases at the joint part 6 and the loss, that is, the iron loss increases. However, in this embodiment, the magnetic domain fine differentiation processed parts 7 are provided on the end surfaces of the strip members 5 in portions lapped with the joint parts 6. The magnetic domain fine differentiation processed parts 7 are obtained by subjecting the surfaces of the strip members 5 to warping-derived magnetic domain fine differentiation, so that the magnetic resistance in these spots can be reduced. As a result, the loss of the wound iron core 1 as a whole can be reduced.

Figure 4:
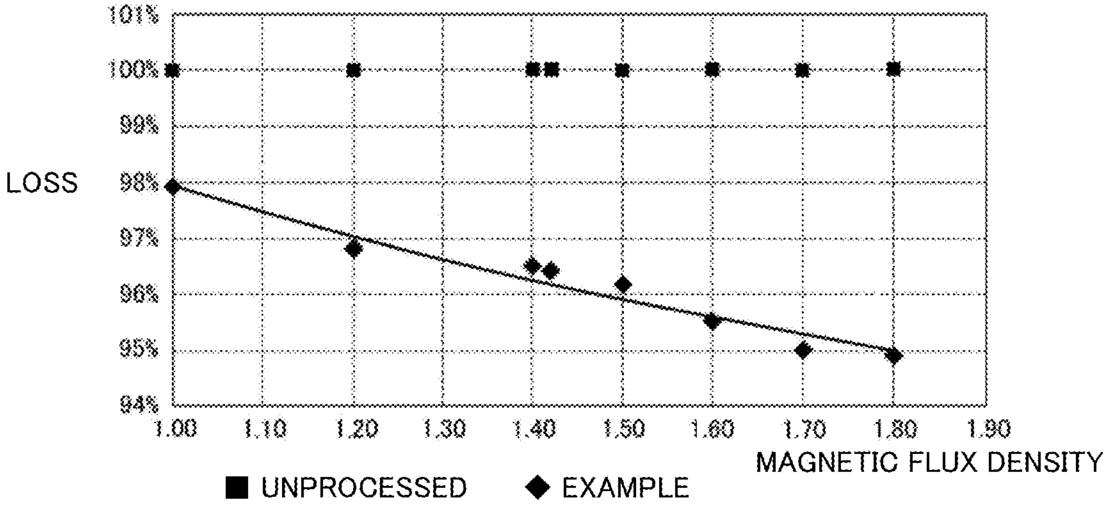
FIG. 4 is a diagram showing loss test results according to the first embodiment.

FIG. 4 shows the results of a test for investigating the losses in a wound iron core 1 of this embodiment in which magnetic domain fine differentiation processed parts 7 are provided to the strip members 5 and a wound iron core with no magnetic domain fine differentiation processed parts. Here, it is a plot of how much the loss in the wound core 1 of the embodiment drops at each magnetic flux density on the basis of the loss of the wound iron core with no subdivision as a reference, that is, 100%. As is clear from the test results, in the wound iron core 1 of this embodiment, the loss can be reduced compared with the one with no magnetic domain fine differentiation processed parts, and the greater the magnetic flux density, the smaller the loss.

As described above, this embodiment in which a plurality of strip members 5 are laminated and the strip members 5 are wound while joint parts 6 where the end portions of the strip members 5 abut one another are disposed in a staggered manner produces an advantageous effect of keeping the loss due to the magnetic resistance at the joint parts 6 small.

In particular, in this embodiment, the strip members 5 are subjected to a grid-pattern laser irradiation in parallel at an interval of 2.0 mm or less in two directions intersecting each other, for example, orthogonal to each other to provide continuous linear marks L1 and L2, thereby forming magnetic domain fine differentiation processed parts 7. Laser irradiation ensures formation of the magnetic domain fine differentiation processed parts 7. It is also clear that at this time, the loss reduction rate can be increased by forming the linear marks L1 and L2 in a grid pattern in two directions and setting the interval of the linear laser processing at that time to 2.0 mm or less, more preferably 0.5 mm or less. In this case, when the interval exceeds 2.0 mm, the effect of loss reduction is impaired.

In this embodiment, in particular, each magnetic domain fine differentiation processed part 7 is located on the lower surface side which is one surface of the surfaces of the end portion of the strip member 5, and within a range where the magnetic flux ϕ lies over another overlapping strip member 5 on one side of the joint part 6. Further, the magnetic domain fine differentiation processed part 7 is provided all over in the width direction generally orthogonal to the rolling direction of the strip members 5. Hence, the magnetic domain fine differentiation processed part 7 can be provided in an area where an adequate effect can be produced, that is, in a necessary and adequate area without unnecessary processing.

(2) Second Embodiment

Figure 5:
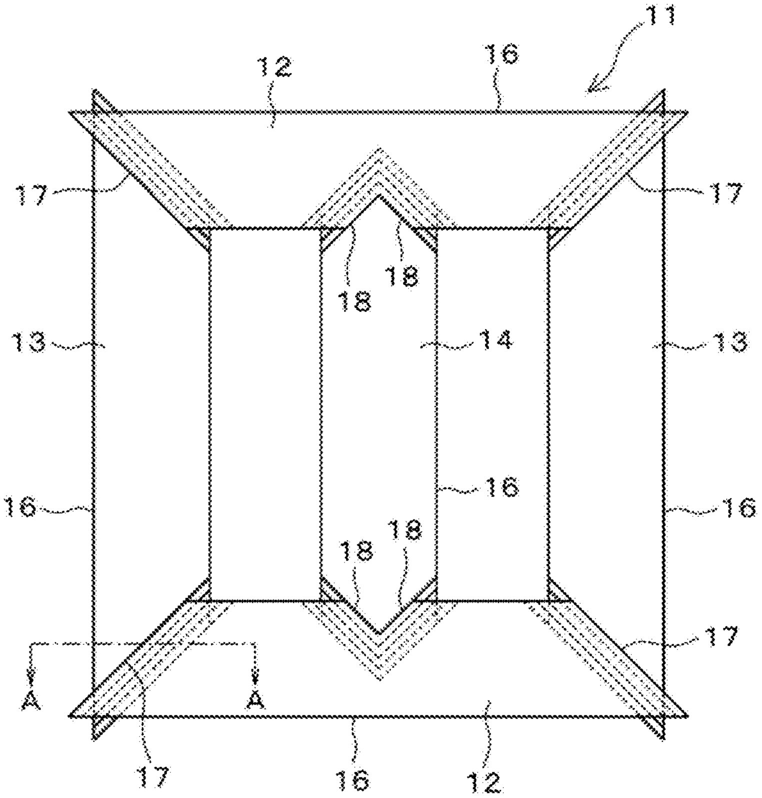
FIG. 5 is a front view schematically showing the overall configuration of a laminated iron core according to a second embodiment.

The second embodiment will now be described with reference to FIGS. 5 to 7. This second embodiment is applied to a laminated iron core. FIG. 5 shows the overall configuration of a laminated iron core 11 for transformers according to this embodiment. The laminated iron core 11 has upper and lower yoke parts 12 and 12 extending in the left-and-right direction in the drawing, left and right leg parts 13 and 13 extending in the up-and-down direction and connecting the yoke parts 12 and 12 up and down, and a central leg part 14. The leg parts 13, 13, and 14 are provided with the respective windings (not shown in the drawing). When the direction is mentioned in the following description, the description will be made taking the state shown in FIG. 5 as the front view.

The yoke parts 12 and 12 and each of the leg parts 13, 13 and 14 constituting the laminated iron core 11 each consist of a plurality of electromagnetic steel plates 16 which are, for example, silicon steel plates laminated in the front-and-rear direction in the drawing. As will be described later, the yoke parts 12 and 12 and each of the leg parts 13, 13, and 14 are butt-joined, thereby forming the entire laminated iron core 11. Note that an oriented electromagnetic steel plate is used as the electromagnetic steel plate 16 constituting the yoke parts 12 and 12, and its rolling direction coincides with the left-and-right direction in the drawing. Similarly, an oriented electromagnetic steel plate is used as the electromagnetic steel plate 16 constituting each of the leg parts 13, 13, and 14, and its rolling direction coincides with the up-and-down direction in the drawing.

The laminated iron core 11 has a so-called frame-like butt shape where the butting portions, the four top, bottom, left, and right corners where the left and right end portions of the yoke parts 12 and 12 and the upper and lower end portions of the left and right leg parts 13 and 13 are joined are cut at about 45 degrees. At this time, as shown in FIG. 6, the joint parts 17 where the yoke parts 12 and 12 and the leg parts 13 and 13 abut one another, both joint part surfaces are step-lap joint parts that are disposed in a stepwise staggered manner in the stacking direction of the electromagnetic steel plates 16 (front-and-rear direction in the drawing).

The central leg part 14 is a V-shaped convex formed by cutting a sheet having a fixed width at both upper and lower ends, from the central portion as a vertex toward both left and right sides at an oblique angle of 45 degrees. A 90-degree V-shaped notch or recess is formed in the central portion of the side portions of the yoke parts 12 and 12 facing inward, corresponding to the central leg part 14. Although not shown in detail in the drawing, the joint parts 18 where the central portion of the side portion of the yoke parts 12 and 12 facing inward and the upper and lower end portions of the central leg part 14 are joined are also step-lap joint parts with their joint part surfaces disposed in a stepwise staggered manner in the stacking direction of the electromagnetic steel plates 16 (front-and-rear direction in the drawing).

Figure 6:
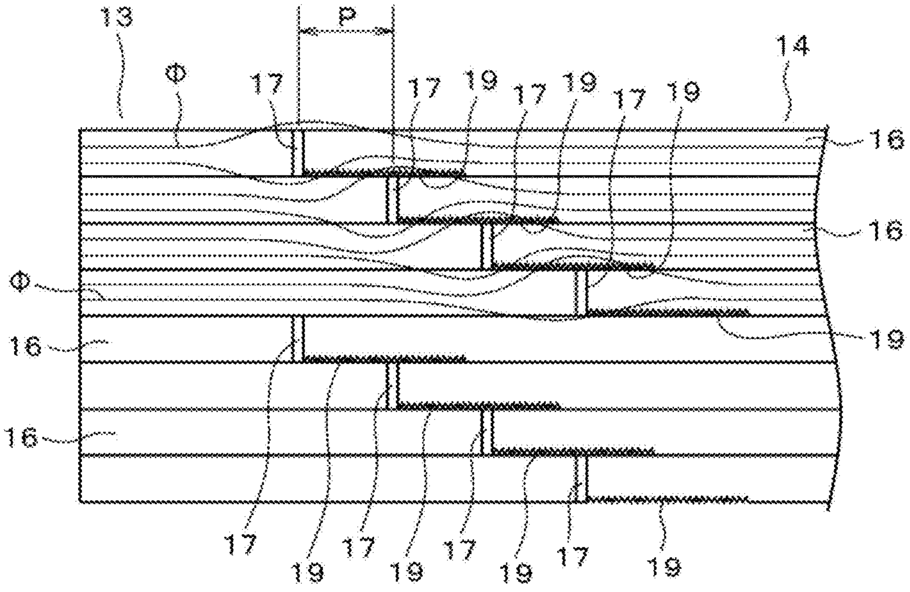
FIG. 6 is an enlarged cross-sectional view of a joint part portion along line AA shown in FIG. 5 according to the second embodiment.
Figure 7:
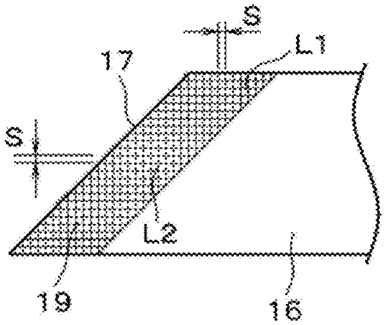
FIG. 7 is an enlarged front view of an end portion of an electromagnetic steel plate according to the second embodiment.

By the way, in this embodiment, as shown in FIGS. 6 and 7, magnetic domain fine differentiation processed parts 19 which have been subjected to warping-derived magnetic domain fine differentiation are provided on the end portion surfaces of the electromagnetic steel plates 16 constituting the yoke parts 12 and 12. In this case, the magnetic domain fine differentiation processed parts 19 are provided in portions constituting the joint parts 17 and 18 on the front side of the electromagnetic steel plates 16, that is, portions lapped with the other overlapping electromagnetic steel plates 16. FIG. 6 shows a cross section along line AA shown in FIG. 5 without hatching for convenience. In FIG. 6, the magnetic domain fine differentiation processed parts 19 are represented by the fine jagged lines for convenience. Each magnetic domain fine differentiation processed parts 19 is located on the front surface side in the drawing which is one surface of the end portion of each electromagnetic steel plate 16 constituting the yoke parts 12 and 12, and is provided within a certain range, for example, within a range of a length that is about twice the pitch p of the displacement of the joint parts 17 and 18 all over in the width direction of the electromagnetic steel plate 16. This range is defined as a range in which each magnetic flux ϕ lies over another overlapping electromagnetic steel plate 16 on the front surface of the end portion of the electromagnetic steel plate 16.

At this time, as partially shown in FIG. 7, the magnetic domain fine differentiation processed parts 19 are formed by subjecting the portions constituting the joint parts 17 and 18 on the surface side of the electromagnetic steel plates 16 to continuous linear laser irradiation in a grid pattern in two directions orthogonal to each other. Consequently, linear marks L1 and L2 due to laser irradiation are formed on the surface of each electromagnetic steel plate 16. Among them, many linear marks L1 extend in the rolling direction of the electromagnetic steel plates 16 in parallel at a predetermined interval s. Meanwhile, many linear marks L2 also extend in the direction orthogonal to the linear marks L1, in this case, in the direction orthogonal to the rolling direction of the electromagnetic steel plates 16 in parallel at a predetermined interval s. In this case, the interval s at which the linear marks L1 and L2 are formed is also 2.0 mm or less.

The acts and effects and advantages of the laminated iron core 11 with the aforementioned configuration will now be explained. First, the procedure for assembling the laminated iron core 111 will be briefly explained. In particular, to assemble the laminated iron core 11, the upper and lower yoke parts 12 and 12, the left and right leg parts 13 and 13, and the central leg part 14 are each prepared by laminating a plurality of electromagnetic steel plates 16 that have been pre-cut into a required shape and, for example, adhesion-integrating them into a block by bonding. Note that the upper and lower yoke parts 12 and 12 can be the same, and the left and right leg parts 13 and 13 can also be the same.

At this time, the upper and lower yoke parts 12 and 12 are formed by forming the magnetic domain fine differentiation processed parts 19 in advance by laser irradiation of portions constituting the joint parts 17 and 18 of the electromagnetic steel plates 16, and laminating the electromagnetic steel plates 16 provided with magnetic domain fine differentiation processed parts 19. To assemble the laminated iron core 11, first, for example, the left and right leg parts 13 and 13 and the central leg part 14 which have been formed into blocks are joined, that is, step-lap joined to the lower yoke part 12 at the joint parts 17 and 18. For joining at this time, for example, a well-known method using a clamp member or a fastening member can be employed. After that, windings, which are not shown in the drawing, are mounted to each of the leg parts 13, 13, and 14, respectively. A block-shaped upper yoke part 12 is then joined, that is, step-lap joined to the upper ends of each of the leg parts 13, 13 and 14 at each of the joint parts 17 and 18.

Consequently, as shown in FIG. 5, the laminated iron core 11 in which the upper and lower yoke parts 12 and 12, the left and right leg parts 13 and 13, and the central leg part 41 are butt-joined is obtained. FIG. 6 shows the cross-sectional shape of the joint parts 17 between the lower yoke part 12 and the left leg part 13 at the lower left in FIG. 5 as a representative of the laminated iron core 11. Both end portions of the electromagnetic steel plate 16 forming the leg part 13 and the electromagnetic steel plate 16 forming the yoke parts 12 are brought into close contact with each other so that they abut one another to form joint parts 17. The joint parts 17 are positioned stepwise. At this time, as shown in FIG. 6, the magnetic domain fine differentiation processed parts 19 on the front surface of the electromagnetic steel plates 16 located on the rear surface side of the joint parts 17 are positioned so as to be lapped with the joint parts 17.

As shown in FIG. 6, the laminated iron core 11 with the aforementioned configuration is provided with the joint parts 17 and 18 where the yoke parts 12 and 12 and the leg parts 13, 13, and 14 abut one another, so that at the joint parts 17 and 18, the magnetic flux ϕ flows across the electromagnetic steel plates 16 abutting in the stacking direction. There is therefore the risk that the magnetic resistance increases at the joint parts 17 and 18 and the loss increases. However, in this embodiment, the electromagnetic steel plates 16 constituting the yoke parts 12 and 12 are provided with the magnetic domain fine differentiation processed parts 19 in portions lapped with the joint parts 17 and 18. The magnetic domain fine differentiation processed parts 19 contribute to a reduction in the magnetic resistance caused by the magnetic fluxes ϕ passing across the electromagnetic steel plates 16. As a result, the loss of the laminated iron core 11 as a whole can be made small.

As described above, according to this embodiment, similarly to the first embodiment, a plurality of electromagnetic steel plates 16 are laminated while the joint parts 17 and 18 where the end portions of the electromagnetic steel plates 16 abut one another are disposed in a staggered manner and magnetic domain fine differentiation processed parts 19 are provided. This produces an advantageous effect of, for example, keeping the loss due to the magnetic resistance at the joint parts 17 and 18 small. This embodiment, in particular, in which the magnetic domain fine differentiation processed parts 19 are provided only in the upper and lower yoke parts 12 and 12, has a simple configuration but produces an adequate effect of reducing the loss, thereby facilitating magnetic domain fine differentiation, that is, laser irradiation.

(3) Third Embodiment and Other Embodiments

Figure 8:
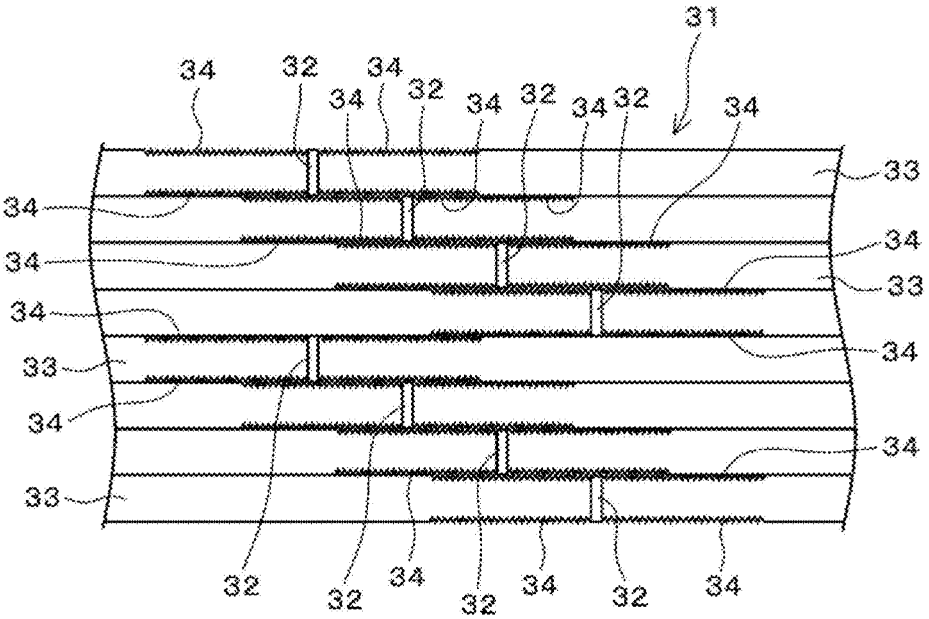
FIG. 8 is an enlarged front view of a joint part according to a third embodiment.

FIG. 8 shows a third embodiment and the configuration of the joint parts 32 portion of the wound iron core 31. This wound iron core 31 is also formed by winding a plurality of strip members 33 made of electromagnetic steel plates in the inner and outer peripheral direction while providing joint parts 32 where the end portions abut one another. The difference between this third embodiment and the first embodiment is that the magnetic domain fine differentiation processed parts 34 are located on both the upper and lower surfaces of the end portion of each strip member 33 and on both sides of each joint part 32 in the drawing.

Also in this case, the magnetic domain fine differentiation processed parts 34 are provided with linear marks in a grid pattern by laser irradiation. The magnetic domain fine differentiation processed parts 34 are located in portions lapped with the joint parts 32 of the other strip members 33 on both surfaces of the end portion of each strip member 33, and provided all over in the width direction of each strip member 33 within a certain range, that is, within a range where the magnetic flux ϕ lies across the overlapping other strip members 33. Similarly to the first embodiment, this third embodiment produces an advantageous effect of, for example, keeping the loss due to the magnetic resistance at the joint parts 32 small.

In each of the aforementioned embodiments, the magnetic domain fine differentiation processed parts are provided by laser irradiation of the surfaces of the electromagnetic steel plates. Alternatively, magnetic domain fine differentiation processed parts may be provided by applying thermal stress by plasma irradiation or engraving with a hot iron, or by applying mechanical stress by a gear or a press. The linear marks in the magnetic domain fine differentiation processed parts are not necessarily provided in a grid pattern, that is, two intersecting directions, and can be formed so as to extend in various directions. They may be provided so as to be inclined obliquely with respect to the rolling direction of the electromagnetic steel plates. The interval s at which linear marks are formed is more preferably 0.5 mm or less.

In addition, it has been confirmed that the effect of reducing loss can be obtained even when the magnetic domain fine differentiation processed parts are provided only partially in the width direction generally orthogonal to the rolling direction of the electromagnetic steel plates. Some of the embodiments described above have been presented as examples and are not intended to limit the scope of the invention. These novel embodiments can be implemented in various other embodiments, and various omissions, replacements, and changes can be made without departing from the gist of the invention. These embodiments and modifications thereof are included in the scope and gist of the invention, and are also included in the scope of the invention described in the claims and the equivalents thereof.

The invention claimed is:

1. An iron core for a stationary induction apparatus, the iron core comprising:

a plurality of electromagnetic steel plates laminated to form the iron core, wherein the electromagnetic steel plates are laminated so that joint parts, at which end portions of the electromagnetic steel plates abut one another, are disposed in a staggered manner; and a respective magnetic domain fine differentiation processed part of each of the electromagnetic steel plates, which is located on a portion of a surface of the end portion of each of the electromagnetic steel plates, lapped with the joint part of another electromagnetic steel plate, and which has been subjected to magnetic domain fine differentiation, in which a magnetic domain is fine differentiated by warping, wherein:

each respective magnetic domain fine differentiation processed part is formed by a plurality of linear marks extending in two intersecting directions in a grid pattern on the surface of the electromagnetic steel plate, each respective magnetic domain fine differentiation processed part is on at least one of the surfaces of the end portions of the electromagnetic steel plate and located on one side or both sides of the joint part, across the surface of the end portion of the electromagnetic steel plate, in which a magnetic flux lies over the overlapping electromagnetic steel plate, and the length of twice a pitch p of the displacement of the joint part, and some of the linear marks extend in a rolling direction of the electromagnetic steel plate, and other linear marks extend in a direction orthogonal to the rolling direction of the electromagnetic steel plate.

2. The iron core for the stationary induction apparatus according to claim 1, wherein each respective magnetic domain fine differentiation processed part is provided all over or partially in a width direction orthogonal to a rolling direction of the electromagnetic steel plate.

3. The iron core for the stationary induction apparatus according to claim 1, wherein the iron core is one of:

a wound iron core configured by winding and laminating a plurality of strip-like electromagnetic steel plates while providing at least one joint part for each roll; and a laminated iron core configured by laminating a plurality of the electromagnetic steel plates so that yoke parts and led parts are formed and abut one another at joint parts.

4. A stationary induction apparatus comprising:

an iron core, the iron core being configured by laminating a plurality of electromagnetic steel plates, wherein the electromagnetic steel plates are laminated so that joint parts, at which end portions of the electromagnetic steel plates abut one another are disposed in a staggered manner; and a respective magnetic domain fine differentiation processed part of each of the electromagnetic steel plates, which is located on a portion of a surface of the end portion of each of the electromagnetic steel plates, lapped with the joint part of another electromagnetic steel plate, and which has been subjected to magnetic domain fine differentiation, where a magnetic domain is fine differentiated by warping, wherein:

each respective magnetic domain fine differentiation processed part formed by a plurality of linear marks extending in two intersecting directions in a grid pattern on the surface of the electromagnetic steel plate, each respective magnetic domain fine differentiation processed part is on at least one of the surfaces of the end portions of the electromagnetic steel plate and located on one side or both sides of the joint part, across the surface of the end portion of the electromagnetic steel plate in which a magnetic flux lies over the overlapping electromagnetic steel plate, and the length of twice a pitch p of the displacement of the joint part, and some of the linear marks extend in a rolling direction of the electromagnetic steel plate, and other linear marks extend in a direction orthogonal to the rolling direction of the electromagnetic steel plate.

5. The stationary induction apparatus according to claim 4, wherein each respective magnetic domain fine differentiation processed part is provided all over or partially in a width direction generally orthogonal to a rolling direction of the electromagnetic steel plate.

6. The stationary induction apparatus according to claim 4, wherein the iron core is one of:

a wound iron core configured by winding and laminating a plurality of strip-like electromagnetic steel plates while providing at least one joint part for each roll; and a laminated iron core configured by laminating a plurality of the electromagnetic steel plates so that yoke parts and leg parts are formed and abut one another at joint parts.

* * * * *